United States Patent [19]

Bartik

[11] 4,058,463

[45] Nov. 15, 1977

[54] ELEMENT FOR FILTERING AND SEPARATING FLUID MIXTURES

[75] Inventor: Ivan Bartik, Cookeville, Tenn.

[73] Assignee: Keene Corporation, New York, N.Y.

[21] Appl. No.: 502,648

[22] Filed: Sept. 3, 1974

[51] Int. Cl.² ............................................. B01D 29/14
[52] U.S. Cl. .................................... 210/317; 210/489;
210/493 R; 210/497 R; 210/DIG. 5
[58] Field of Search .......................... 210/23, 315–317,
210/489–491, DIG. 5, 493 R, 497 R

[56] References Cited

U.S. PATENT DOCUMENTS

| | | | |
|---|---|---|---|
| 1,624,832 | 4/1927 | Glover | 210/315 |
| 2,739,713 | 3/1956 | Robinson | 210/23 X |
| 2,911,101 | 11/1959 | Robinson | 210/315 X |
| 2,918,173 | 12/1959 | Daley et al. | 210/315 X |
| 2,984,361 | 5/1961 | Marvel | 210/23 X |
| 3,115,459 | 12/1963 | Giesse | 210/DIG. 5 |
| 3,208,596 | 9/1965 | Gravert | 210/DIG. 5 |
| 3,209,916 | 10/1965 | May et al. | 210/DIG. 5 |
| 3,376,979 | 4/1968 | Bair | 210/490 X |
| 3,419,151 | 12/1968 | Smith et al. | 210/489 X |
| 3,450,632 | 6/1969 | Olson et al. | 210/23 |

Primary Examiner—Thomas G. Wyse
Assistant Examiner—Robert H. Spitzer
Attorney, Agent, or Firm—Albert L. Jeffers; Roger M. Rickert

[57] ABSTRACT

An element for filtering and separating fluid mixtures, especially admixed or emulsified fluids and, in particular, mixtures and/or emulsions of oils, fuels and the like and water, in which the fluid to be are removed from the fluid by filtration, and the oil therein is coalesced and separated from the water.

10 Claims, 6 Drawing Figures

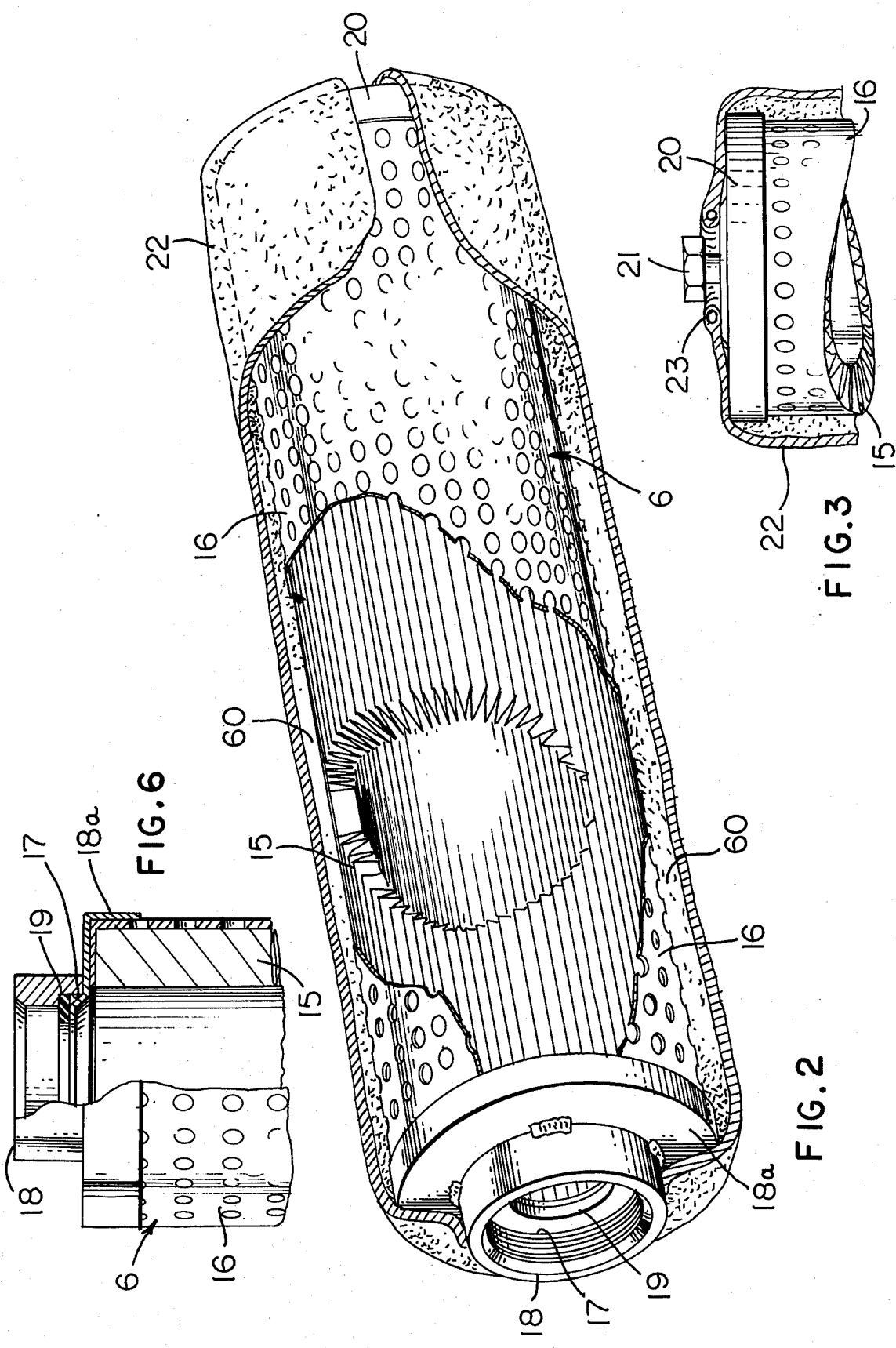

ELEMENT FOR FILTERING AND SEPARATING FLUID MIXTURES

The present invention relates to an element for treating fluid mixtures, especially effluent waters containing solid contaminants, oils, fuels and the like and which fluid, if discharged without treatment, could cause pollutin of land, streams, rivers, lakes or seas.

It has always been a problem to dispose of the waste fluids, usually water, from industrial processes and marine vessels, because the fluids generally contain a substantial amount of contaminants in the form of solid matter, oil, fuel, and similar liquids. It has, therefore, come about that the discharge of untreated contaminated waters from industrial processes, plants, or marine vessels is prohibited. The penalties for unauthorized discharge or dumping of contaminated fluids are severe, and a rather rigid set of regulations and guidelines have been established to regulate the discharge of waste fluids thereby to protect the environment.

BRIEF SUMMARY OF THE INVENTION

According to the present invention, the contaminated fluid mixture to be treated is passed through one or more filtration elements which can be conveniently located inside respective pressure vessels. Each element provides for filtration of the fluid and also for coalescing of the admixed fluids in individual droplets of substantial size. The oil and water conventionally making up the admixed fluids to be treated will, therefore, have a strong tendency to separate by gravity within the pressure vessel after passing through the respective element.

The element referred to is substantially cylindrical and receives fluids to be treated on the inside for radially outward flow through the element. The element has an inner layer of filtering material which removes particulate solid material from the fluids. The inner layer is mechanically supported on the outside and surrounding the support for the inner layer is a coalescing media which causes the oil and water in the fluids effectively to separate.

The oil separated from the water will raise by difference in specific gravity to the upper portion of the pressure vessel from whence the oil can be drawn off from the vessel, while the water, which has higher specific gravity, sinks toward the bottom of the vessel and is discharged from the lower portion of the pressure vessel.

The water withdrawn from the lower portion of the vessel is substantially uncontaminated and can be discharged to substantially any receiving region without danger of contamination.

The separation of the solid contaminants and of the oil from the water is a function of the various media making up the element at given efficiency, and it will, therefore, be apparent that various degrees of purification of the water can be achieved by passing the water to be treated through a plurality of elements arranged in series. In this manner, even the most stringent known requirements for removal of solids and oils from the treated water can be achieved.

With the foregoing in mind, a primary objective of the present invention is the provision of an element for the treatment of contaminated fluids, especially water, to filter out contaminants and to coalesce and separate oil from the water so that the water is sufficiently free of contaminants and oil to permit it to be discharged without creating en environmentally unacceptable condition.

Another object of the provision of an element for treating industrial discharge waters to remove oil, fuels or other liquids from the water so that the water is sufficiently clean to be discharged into sewers or other collection systems.

A still further object is the provision of an element for treating water in the form of industrial discharge to the point that the water is sufficiently purified to permit the water to be discharged on land or into surface waters.

A still further object is the provision of an element for treating bilge and ballast water on a marine vessel to cause the water to be sufficiently clarified that it can be discharged overboard without further treatment Another object of the invention is to provide on apparatus embodying the element referred to in which the element can readily be replaced by a new element when it becomes clogged, fouled or otherwise inoperative.

A further object of the invention is to provide an element of the nature referred to which is inexpensive so that it can be discarded when necessary.

A still further object of the invention is to provide an element of the nature referred to having a structure which is composed of extended area filtration material, and fiber layers surrounding the filtration material which are compressed to a predetermined density and retained mechanically to maintain said density.

It is yet another object of the invention to provide an element as described above which is encased in a separator element which is sealed with respect to both ends of the element.

Still another object of the invention is to provide an additional separator medium which surrounds the element on the discharge side and which prevents entrainment of the separated liquid in the main liquid.

The objects referred to above, as well as still other objects and advantages of the present invention, will become more apparent upon reference to the following detailed specification taken together with the accompanying drawings in which:

FIG. 2 is a perspective view of a filtering and coalescing element according to the present invention, partly broken away to show the construction thereof.

FIG. 3 is a fragmentary view showing how the outer sleeve of the element is tied at one end of the element.

FIG. 6 is a fragmentary view showing a section of the nozzle.

Figure 1:
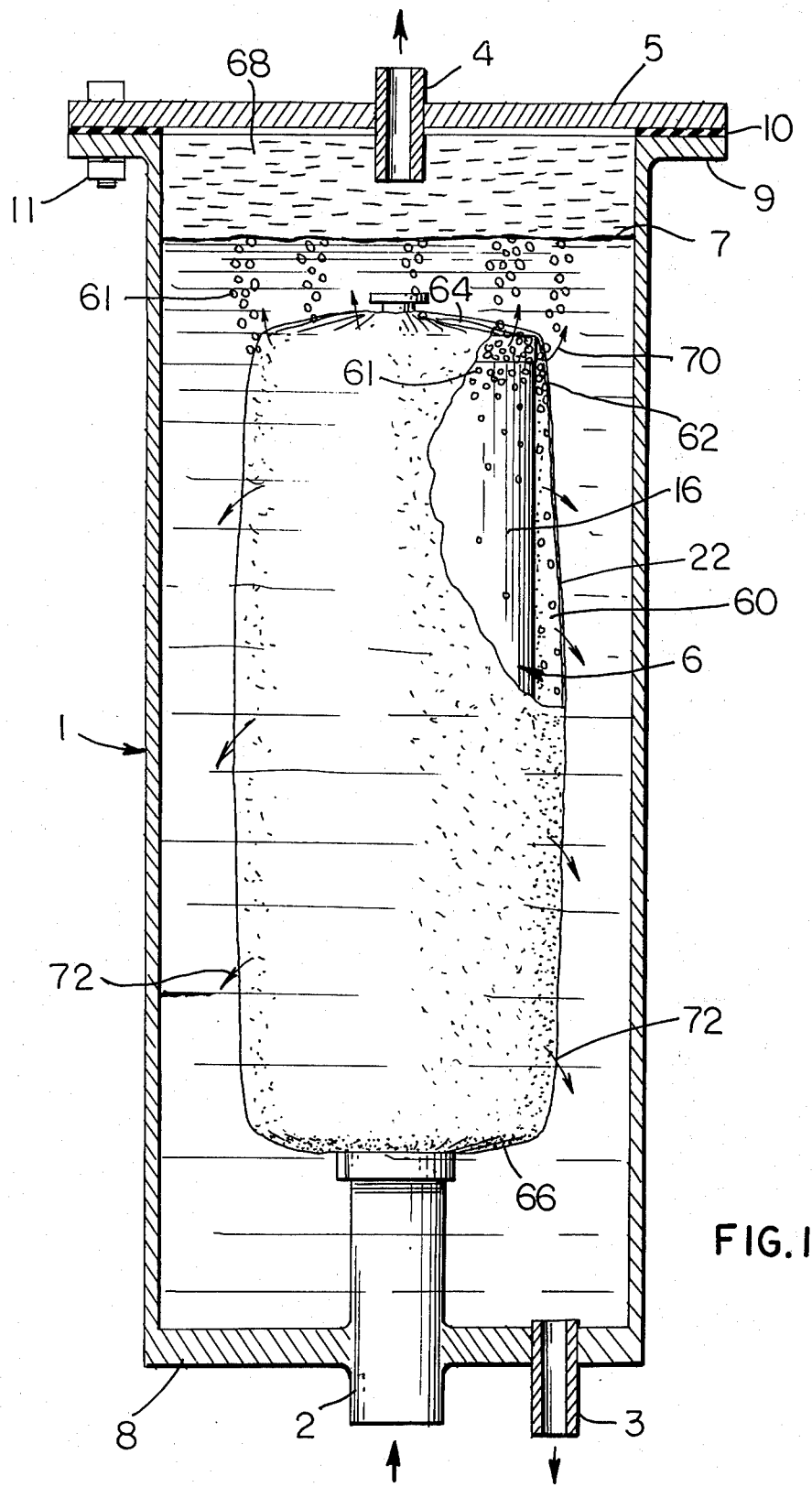
FIG. 1 is a vertical section through a pressure vessel having an element according to the present invention mounted therein.

DETAILED DESCRIPTION OF THE INVENTION:

Referring to the drawings somewhat more in detail, FIG. 1 shows a pressure vessel 1 closed on the lower end with fixed head 8 and having, at the other end, a removable cover 5 secured by fasteners 11. A gasket 10 is placed between the flange 9 and cover 5 to seal the cover to the vessel.

Leading into the upper portion of the pressure vessel 1 is an oil discharge conduit 4. Entering the lower portion of the pressure vessel 1 in a central location is an inlet conduit 2 and connected to the inside of the element 6 at the lower end of the element. Also leading from the lower portion of the pressure vessel 1 in a radially offset location is a water discharge conduit 3.

As the liquid begins to flow from inlet conduit 2 into element 6 and then radially outwardly through element 6, a substantial portion of the solid contaminant in the liquid is removed inside the element while coalesced oil is released from the upper portion of the separator element 22. The oil droplets are of substantial size and will rise in the water in the pressure vessel by gravitational action toward the top of the vessel 1 where the oil collects to be discharged from the vessel through the oil discharge conduit 4. The oil-water interface in FIG. 1 is indicated by reference numeral 7. The water which is purified by removal therefrom of solid matter and by the separation of oil therefrom will leave the vessel 1 through water discharge conduit 3.

FIG. 2 shows an element for filtration and oil separation wherein filtration is the prime function. In FIG. 2, the fluid enters the element via inlet nozzle 18 at one end of the element and is conducted through the inner pleated filter media 15, mechanical supporting member 16 and the outer separation media 22. Nozzle 18 is formed on an end cap 18a which closes the lower end of the element.

The nozzle 18 is provided with an annular recess 17 adjacent the inside end thereof and a sealing gasket 19 is positioned therein. The nozzle 18 can be made from a single piece of plastic or metal, or it can be fabricated from two or more parts consisting, for example, of a nipple, or coupling attached to and sealed to the end cap 18a.

The inner filtering media in the element is a soft porous pleated filtration media 15 which is capable of removing fine particle size solid contaminants from liquid passing therethrough and coalescing a large percentage of the oil in the water. The media 15 is sealed at one end to end cap 18a and at the other end to an upper end cap 20.

Surrounding the pleated media 15 is a cylindrical mechanical support member 16 which is of open or perforated construction to allow the liquid to pass radially there-through. Member 16 supports and adds strength to the soft pleated media 15, especially during pressure buildup in the enclosing vessel.

The element 6 is loosely enclosed in an outer separator media element 22, sealed on one end around nozzle 18, and sealed on the other end around a stud 21 fixed to end cap 20. The end of the stud 21 is conveniently shaped to receive a wrench to allow torque to be supplied to the element for engagement and disengagement of nozzle 18 and conduit 2.

The function of the separator media element 22 is to stop small droplets of oil coalesced by the filtration media 15 and to conduct the droplets by gravitational action through the annular space 60 between the mechanical support 16 and the separator media element 22 to the upper portion of the separator element where the droplets can collect, merge together into larger droplets and, when of substantial size, release the droplets through the separator element 22. The released oil droplets will rise by gravitational action toward the top of the unit 1.

FIG. 3 shows one method of how the separator media element is secured about stud 21, as by a drawstring 23, which is drawn up tight when the separator element 22 is in place on the element 6.

Figures 4, 5:
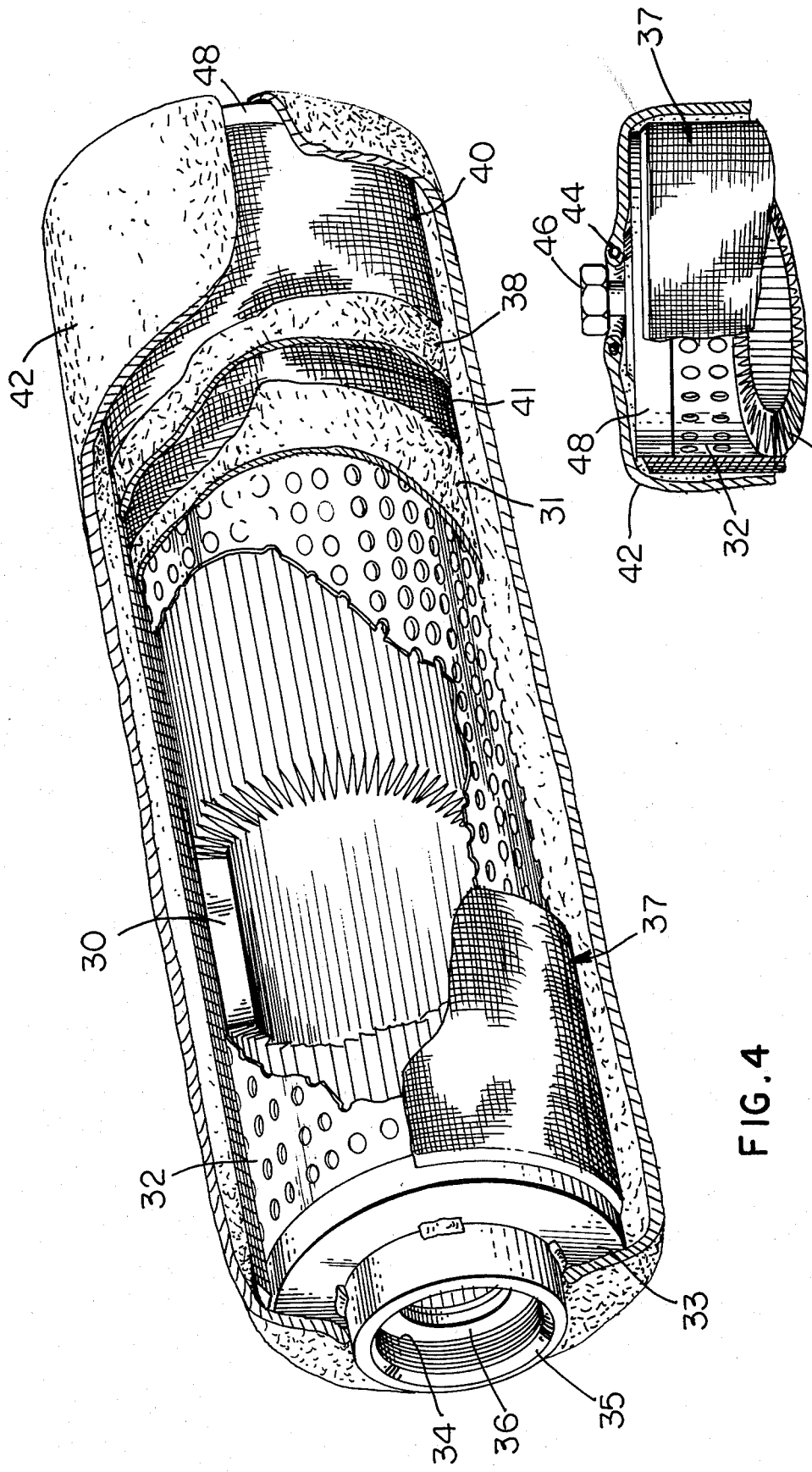
FIG. 4 is a view like FIG. 2 but showing a modification.
FIG. 5 is a detail of the FIG. 4 modification and is similar to FIG. 3.

FIG. 4 illustrates a filtration and oil separation element 37 having the prime function of oil separation. This element is similar in construction to the element shown in FIG. 2 and includes a top end cap and a lower end cap having means for connection to the inlet pipe of the vessel in which the element is mounted. In the element 37 of FIG. 4, however, additional coalescing media are added around the inner filter media to facilitate breaking of the water/oil emulsion and separating of the oil droplets from the processed liquid.

The inner pleated porous paper filtering media 30 in FIG. 4 is surrounded by the cylindrical mechanical support member 32. Lower end cap 33 includes an inlet fitting 35 provided with a recess 34 and gasket 36. The lower end cap, as with the FIGS. 2 and 3 modifications, is sealed to the paper inner filter and support member 32. Member 32, in turn, is surrounded by one or more layers of fiberglass material 31, namely, bonded "A" fiberglass compressed to a predetermined density by the tension of surrounding screen material 41.

Layer 41 is followed by one or more layers of unbonded "B" fiberglass 38 compressed to a predetermined density by the tension of surrounding screen material 40. The fiberglass layers 31 and 38 can be varied in respective densities by changing of tension of the respective surrounding screen materials 41 and 40. An outer separator media element 42 loosely surrounds the element 37 as in the FIG. 2 modification.

Bonded "A" fiberglass is a term used in the fiberglass industry to designate a small diameter fiber. The term unbonded "B" fiberglass is a term used to designate a fiber larger in diameter than the "A" fiberglass. The term "unbonded" means that the fiberglass does not have a bonding agent.

FIG. 5, similarly to FIG 3, shows a drawstring 44 which gathers the end of the outer separator media element 42 about a stud 46 secured to the upper end cap 48 of the element which end cap, similarly to end cap 33, is sealed to the paper inner filter and the support member 32.

In the manufacture of a typical element according to the present invention, the pleated inner filtering layer is formed to a diameter of about 4¼ inches outside diameter and has about 2⅜ inches inside diameter and may have about 65 pleats formed therein with sharp peaks. Different sized elements may be made to meet various flow rates and applications. The material employed, referred to as a paper, is composed of rayon, polyester fiber and microglass.

The paper has pores which will halt particulate material from about 5 microns upwardly. In a pleated filter element of the size described, about 22.2 square feet are presented for liquid flow. The paper is pleated and formed into a tubular configuration and the opposed edges are sealed together.

The pleats are then arranged so as to be uniformly circumferentially spaced, and the outer perforated cylindrical support member is placed thereon, and the end caps 18a, 20 in FIGS. 2 and 3 and 33, 48 in FIGS. 4 and 5 are attached to the opposite ends of the pleated elements and the surrounding support member so as to be sealed thereto.

In the case of the unit of FIG. 2, the pleated element 15 with its surrounding perforated supporting member 16 is then encased in the outer separator media element 22 and which, as mentioned, is fitted around the inlet fitting 18 at the bottom of the element 6 and then gathered around the stud 21 at the top of the element. The draw cord 23 at the top of the element 22 preferably has the ends heat sealed to prevent loosening of the outer separator element 22 after the unit is assembled.

The outer separator media elements 22 and 42 are advantageously formed of a liquid pervious material, for example, non-woven polyester felt which when preferentially wetted with water will inhibit the passage therethrough of small droplets of oil so that the oil rises inside the outer separator media element and coalesces into larger droplets near the top of the separator media element and which then escape through the upper end of the separator element when the oil droplets accumulate at the top and have sufficient force to overcome the water tension within the separator element.

Since the separator media element 22 or 42 is loosely fitted over the body of the element 6 or 37, it will balloon outwardly during flow conditions, as shown in FIG. 1, thus creating an annular space 60 between the respective closed ends 64 and 66 of the separator element. The annular space 60 permits the oil droplets 61 to flow upwardly on the inner surface of the separator element, accumulating at the top portion 62 where the oil droplets overcome the water tension and pass through the separator element 22 or 42 to an accumulating region 68, as shown by the arrows 70, and then out the oil discharge 4 which is controlled by a valve (not shown). The water will flow directly through the separator media element and will fall downwardly as shown by the arrows 72.

In the case of the filter element of FIG. 4, the pleated paper inner layer 30 and the perforated surrounding supporting sleeve 32 are wrapped at 31 with one or more wraps of bonded "A" fiberglass material. On top of the "A" fiber material there is wrapped screen material 41 which provides support and a predetermined density to the fiberglass material.

This screen 41 is wound with an overlap at a predetermined tension which may be, for example, 20 pounds. After the screen wrap 41 is fastened in place, there is wrapped thereover a layer of unbonded "B" fiberglass at 38, and this fiberglass layer is then confined with the same type of screen as mentioned above with the overlap between adjacent convolutions of the screen with the tension, in this case, being, for example, about 6 pounds tension. The screen over the "B" fiberglass wrap is indicated at 40.

The screen wrap 40 is then fastened in place, and the outer fluid pervious separator media element 42 is looslely placed around the element and fits about the inlet nozzle at the one end of the filter element and is gathered about the stud 46 on end cap 48 at the upper end thereof. The separator media element 42 operates in the same manner as the separator media element 22.

Modifications may be made within the scope of the appended claims. For example, the filter and coalescer elements 6 and 37 can be made separately from the separator elements 22 and 42 so that they may be replaced with new filter coalescer elements when they have served a useful life.

What is claimed is:

1. In an element for removing particulate material from water and for coalescing oil in the water into droplets of substantial size; a cylindrical pleated inner member, a perforated cylindrical support member surrounding said pleated member in supporting relation thereto, end caps sealed to opposite ends of the assembly of said pleated member and support member, a fluid inlet in one of said end caps, and a separator element of liquid pervious material loosely surrounding said support member and having the opposite end portions sealed with respect to the support member, said element adapted for being disposed in a vertical position in a pressure vessel having means for connection to said fluid inlet, said separator element retarding the flow of oil droplets therethrough while freely passing the water droplets whereby the oil droplets migrate upwardly in the separator element and merge into larger droplets and emerge through an upper region of the separator element.

2. An element according to claim 1 which includes at least one porous layer of fibrous material surrounding said cylindrical member inside said separator element, and a foraminous wrap surrounding said layer of fibrous material and holding the material in compressed condition.

3. An element according to claim 2 in which said porous layer comprises glass fibers.

4. An element according to claim 1 which includes a first porous layer of fibrous material mounted on the outer side of said support member and a first foraminous wrap surrounding said first layer and holding the first layer in compressed condition, a second porous layer of fibrous material mounted on the outer side of said first wrap and a second foraminous wrap surrounding said second layer and holding said second layer in compressed condition.

5. An element according to claim 4 in which said first layer has a greater density than said second layer.

6. An element according to claim 4 which at least one of said porous layers is formed of fiberglass.

7. An element according to claim 4 in which both of said porous layers are formed of fiberglass.

8. An element according to claim 1 in which said pleated inner member is formed of paper-like material containing glass fibers.

9. An element according to claim 1 in which said pleated inner member is formed of paper-like material containing polyester fibers.

10. An element according to claim 1 in which said separator element is formed of non-woven polyester material.

* * * * *

UNITED STATES PATENT AND TRADEMARK OFFICE
CERTIFICATE OF CORRECTION

PATENT NO. : 4,058,463
DATED : November 15, 1977
INVENTOR(S) : Ivan Bartik

It is certified that error appears in the above-identified patent and that said Letters Patent are hereby corrected as shown below:

In title "An" omitted at beginning

Abstract, line 4, after "be" insert -- treated is passed through the element. The contaminants...--

Col. 2, line 4, "of" first occurrence, should be -- is --

Col. 2, line 17, "on" should be -- an --

Col. 6, line 43 (Claim 6) "in" omitted between "4" and "which".

Signed and Sealed this

Twenty-eighth Day of February 1978

[SEAL]

Attest:

RUTH C. MASON
Attesting Officer

LUTRELLE F. PARKER
Acting Commissioner of Patents and Trademarks